(12) United States Patent
Sherkin

(10) Patent No.: US 8,452,017 B2
(45) Date of Patent: May 28, 2013

(54) METHODS AND SYSTEMS FOR SECURE CHANNEL INITIALIZATION TRANSACTION SECURITY BASED ON A LOW ENTROPY SHARED SECRET

(75) Inventor: Alexander Sherkin, Newmarket (CA)

(73) Assignee: Research In Motion Limited, Waterloo, CA (US)

(*) Notice: Subject to any disclaimer, the term of this patent is extended or adjusted under 35 U.S.C. 154(b) by 933 days.

(21) Appl. No.: 11/962,189

(22) Filed: Dec. 21, 2007

(65) Prior Publication Data

US 2009/0161876 A1   Jun. 25, 2009

(51) Int. Cl.
*H04L 29/06* (2006.01)

(52) U.S. Cl.
USPC .......... 380/285; 380/284; 380/283; 713/171; 713/168

(58) Field of Classification Search
None
See application file for complete search history.

(56) References Cited

U.S. PATENT DOCUMENTS

| | | | |
|---|---|---|---|
| 5,953,420 A | 9/1999 | Matyas, Jr. et al. | |
| 6,002,769 A | 12/1999 | McGough | |
| 6,226,383 B1 | 5/2001 | Jablon | |
| 6,367,009 B1 | 4/2002 | Davis et al. | |
| 6,445,797 B1 | 9/2002 | McGough | |
| 6,718,467 B1 | 4/2004 | Trostle | |
| 6,757,825 B1* | 6/2004 | MacKenzie et al. | 713/169 |
| 6,829,356 B1* | 12/2004 | Ford | 380/44 |
| 6,980,660 B1* | 12/2005 | Hind et al. | 380/282 |
| 7,007,164 B1* | 2/2006 | Euchner | 713/168 |
| 7,231,516 B1* | 6/2007 | Sparrell et al. | 713/156 |
| 7,240,192 B1* | 7/2007 | Paya et al. | 713/152 |
| 7,359,507 B2* | 4/2008 | Kaliski | 380/30 |

(Continued)

FOREIGN PATENT DOCUMENTS

| | | |
|---|---|---|
| EP | 1079565 | 2/2001 |
| WO | 2005107141 | 11/2005 |
| WO | 2006048043 | 5/2006 |

OTHER PUBLICATIONS

C. Boyd, P. Montague, and K. Nguyen. Elliptic Curve Based Password Authenticated Key Exchange Protocols. In ACISP '01, LNCS 2119, pp. 487-501. Springer-Verlag, Berlin, 2001.*

(Continued)

*Primary Examiner* — Nathan Flynn
*Assistant Examiner* — Michael R Vaughan
(74) *Attorney, Agent, or Firm* — Moffat & Co.

(57) ABSTRACT

Methods and systems for secure channel initialization transaction security between a client network element and a server network element are disclosed. In accordance with one embodiment of the present disclosure, the method includes: choosing a random client ephemeral private key at a client network element; utilizing the client ephemeral private key and the shared secret to create a client ephemeral public key at the client network element; forwarding the client ephemeral public key in a channel initialization request to a server network element; selecting a random server ephemeral private key at the server network element; using the server ephemeral private key and the shared secret to create a server ephemeral public key at the server network element; creating a high entropy shared secret based on the client ephemeral public key and the server ephemeral private key; creating a message authentication code 'MAC' and encrypting a payload with the high-entropy shared secret; sending the encrypted payload and the server ephemeral public key to the client network element; utilizing the server ephemeral public key and the client ephemeral private key to derive the high-entropy shared secret; and decrypting the payload and verifying the MAC with the high-entropy shared secret.

19 Claims, 10 Drawing Sheets

U.S. PATENT DOCUMENTS

| | | | |
|---|---|---|---|
| 7,366,902 | B2 | 4/2008 | Bakke |
| 7,478,434 | B1* | 1/2009 | Hinton et al. ............... 726/27 |
| 7,627,760 | B2* | 12/2009 | Lauter et al. ............... 713/171 |
| 7,646,872 | B2* | 1/2010 | Brown et al. ............... 380/277 |
| 7,694,141 | B2* | 4/2010 | Lauter et al. ............... 713/171 |
| 7,725,730 | B2* | 5/2010 | Juels et al. ............... 713/183 |
| 2001/0021256 | A1 | 9/2001 | Menezes |
| 2003/0072059 | A1 | 4/2003 | Thomas et al. |
| 2004/0030932 | A1* | 2/2004 | Juels et al. ............... 713/202 |
| 2005/0188193 | A1 | 8/2005 | Kuehnel et al. |
| 2005/0251680 | A1 | 11/2005 | Brown et al. |
| 2006/0053288 | A1* | 3/2006 | Stern et al. ............... 713/168 |
| 2006/0093138 | A1* | 5/2006 | Durand et al. ............. 380/44 |
| 2006/0129917 | A1 | 6/2006 | Volk et al. |
| 2007/0043946 | A1* | 2/2007 | Lauter et al. ............... 713/171 |
| 2007/0067629 | A1* | 3/2007 | Mackenzie et al. ........ 713/168 |
| 2007/0288753 | A1* | 12/2007 | Gehrmann ............... 713/171 |
| 2008/0114983 | A1 | 5/2008 | Sherkin et al. |
| 2008/0229105 | A1* | 9/2008 | Jeffries et al. ............... 713/169 |
| 2008/0318670 | A1* | 12/2008 | Zinder et al. ............... 463/25 |
| 2009/0031125 | A1* | 1/2009 | Bjorn ............... 713/155 |
| 2009/0161876 | A1 | 6/2009 | Sherkin |
| 2009/0222672 | A1* | 9/2009 | Clarke et al. ............... 713/189 |
| 2009/0287922 | A1 | 11/2009 | Herwono et al. |
| 2009/0319788 | A1* | 12/2009 | Zick et al. ............... 713/168 |
| 2010/0017599 | A1* | 1/2010 | Sellars et al. ............... 713/156 |

OTHER PUBLICATIONS

Ford W, Kaliski Jr BS (2000) Server-assisted generation of a strong secret from a password. In: Proceedings of the 5th IEEE international workshop on enterprise security, Gaithersburg, MD Jun. 2000.*

D. Jablon, Extended Password Key Exchange Protocols Immune to Dictionary Attacks Proceedings of the Sixth Workshops on Enabling Technologies: Infrastructure for Collaborative Enterprises (WET-ICE '97), IEEE Computer Society, Jun. 18-20, 1997, Cambridge, MA, pp. 248-255.*

Wikipedia, Speke, Mar. 12, 2008, "http://en.wikipedia.org/wiki/Speke", pp. 1 to 3.

Denning D E et al: "Timestamps in Key Distribution Protocols" Communications of the Association for Computing Machinery, ACM, New York, NY, US, vol. 24, No. 8, Jan. 1, 1981, pp. 533-536, XP000907070.

Blake-Wilson Safenet N Bolyard Sun Microsystems V Gupta Sun Labs C Hawk Corriente B Moeller Ruhr-Uni Bochum S: "Elliptic Curve Cryptography (ECC) Cipher Suites for Transport Layer Security (TLS); rfc4492.txt" IETF Standard, Internet Engineering Task Force, IETF, CH, May 1, 2006, XP015054997.

Extended European Search Report, EP07124018, Oct. 20, 2008.

European extended SR, EP 07124019.6, dated Jul. 18, 2008.

International Search Report of Application No. PCT/CA2005/000676, date of mailing Aug. 22, 2005—15 pages.

EP application No. 08151615.5, Communication pursuant to Article 94(3) EPC dated Nov. 18, 2009.

Canadian application No. 2,656,862, office action dated Jan. 25, 2012.

Alan O. Freier et al, The SSL Protocol, Version 3.0, Nov. 18, 1996, "http://wp.netscape.com/eng/ssl3/draft302.txt", pp. 1 to 62.

Wikipedia, Diffie-Hellman key exchange, Mar. 12, 2008, "http://en.wikipedia.org/wiki/Diffie-Hellman", pp. 1 to 6.

Wikipedia, Speke, Mar. 12, 2008 "http://en.wikipedia.org/wiki/Speke", pp. 1 to 3.

D. Jablon, The Speke Password-Based Key Agreement Methods, Network Working Group, Oct. 22, 2003, "http://tools.ietf.org/html/draft-jablon-spede-02", pp. 1 to 28.

Wikipedia, Shanks-Tonelli algorithm, last modified Nov. 28, 2007, http://en.wikipedia.org/wiki/Shanks-Tonelli_algorithm, pp. 1 and 2.

Wikipedia, Legendre symbol, last modified Mar. 8, 2008, http://en.wikipedia.org/wiki/Legendre_symbol, pp. 1 to 5.

Wikipedia, Elliptic curve cryptography, last modified Mar. 8, 2008, "http://en.wikipedia.org/wiki/Elliptic_curve_cryptography", pp. 1 to 9.

Canadian patent application No. 2,646,862, office action dated Sep. 13, 2012.

* cited by examiner

METHODS AND SYSTEMS FOR SECURE CHANNEL INITIALIZATION TRANSACTION SECURITY BASED ON A LOW ENTROPY SHARED SECRET

FIELD OF THE DISCLOSURE

The present disclosure relates to authentication and authorization of communications and in particular to authentication and authorization of communications between multiple elements within a network.

BACKGROUND

Often, computer systems consist of multiple components or elements hosted by different machines. System components usually communicate over a network. Often, communication between two components of the same system requires secure channels that guarantee confidentiality, integrity and mutual authentication. Various methods of accomplishing this are utilized and include, but are not limited to, a secured sockets layer/transport layer security (SSL/TLS) protocol. SSL/TLS is supported by a wide range of technologies such as: Java 2 Enterprise Edition (J2EE) application servers or Microsoft Internet Information Server (MS IIS). However, in the case of SSL/TLS, each component of the system should trust each other's components certificate in order to communicate.

In the case of SSL/TLS, a special initialization step is required to ensure that each component in the system trusts the other component's certificates.

More generally, many secure channel protocols require a special initialization step that guarantees that all system components have necessary authentication attributes such as certificates or user names/passwords, among others, that are necessary for communication.

BRIEF DESCRIPTION OF THE DRAWINGS

The present disclosure will be better understood with reference to the drawings in which.

DETAILED DESCRIPTION OF THE DRAWINGS

Figure 1:
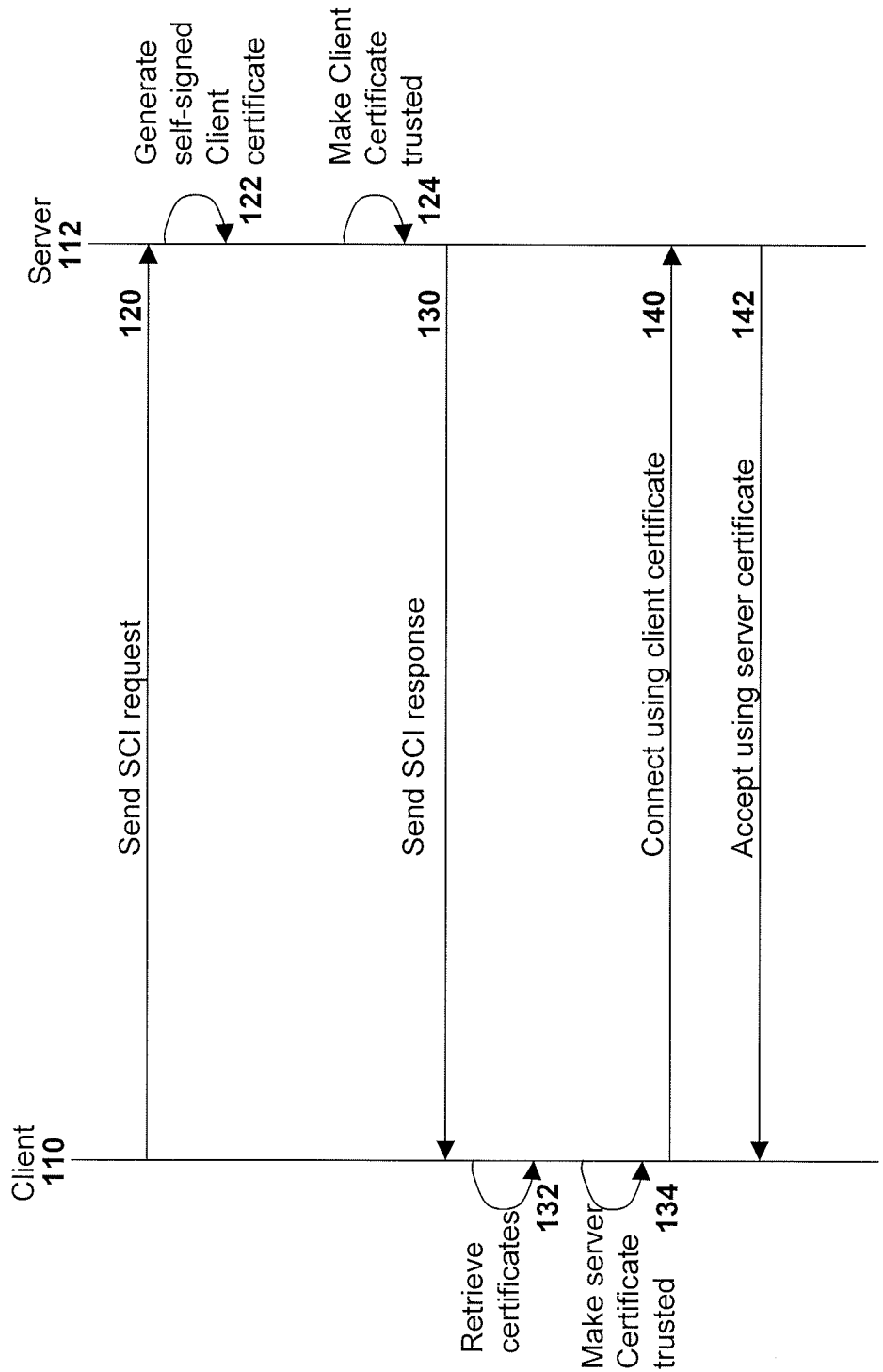
FIG. 1 is a data flow diagram showing a secure channel initialization transaction between a client and a server.

The present disclosure provides a method for secure channel initialization for a client network element, the method comprising: sending a secure channel initialization request from the client network element; and receiving a secure channel initialization response at the client network element, the secure channel initialization response including a server credential and a client credential, wherein said server credential and said client credential are used to establish a secure session.

The present disclosure further provides a method for secure channel initialization with a server network element, the method comprising: receiving a secure channel initialization request at the server network element; creating a server credential and a client credential at the server network element; and sending a secure channel initialization response from the server network element, the secure channel initialization response including the server credential and the client credential, wherein said server credential and said client credential are used to establish a secure session.

The present disclosure further provides a method for secure channel initialization transaction security utilizing a low-entropy shared secret at a client network element, the method comprising: choosing a random client ephemeral private key at a client network element; utilizing the client ephemeral private key and the shared secret to create a client ephemeral public key at the client network element; forwarding the client ephemeral public key in a channel initialization request; receiving an encrypted payload, a message authentication code 'MAC' and a server ephemeral public key; utilizing the server ephemeral public key and the client ephemeral private key to derive a high-entropy shared secret; and decrypting the payload and verifying the MAC with the high-entropy shared secret.

The present disclosure further provides a method for secure channel initialization transaction security utilizing a low-entropy shared secret at a server network element, the method comprising: receiving a client ephemeral public key in a channel initialization request; selecting a random server ephemeral private key; using the server ephemeral private key and the shared secret to create a server ephemeral public key; creating a high-entropy shared secret based on the client ephemeral public key and the server ephemeral private key; creating a message authentication code 'MAC' and encrypting a payload with the high-entropy shared secret; and sending the encrypted payload, MAC and the server ephemeral public key.

The present disclosure further provides a client network element adapted for secure channel initialization, the client network element comprising a processor; a communications subsystem; and memory; the client network element being adapted to: send from said communications subsystem a secure channel initialization request; and receive at the communications subsystem a secure channel initialization response at the client network element, the secure channel initialization response including a server credential and a client credential, wherein said server credential and said client credential are used to establish a secure session.

The present disclosure further provides a server network element adapted for secure channel initialization, the server network element comprising a processor; a communications subsystem; and memory; the server network element being adapted to: receive at the communications subsystem a secure channel initialization request; and create at the processor a server credential and a client credential at the server network element; send from the communications subsystem a secure channel initialization response, the secure channel initialization response including the server credential and the client credential, wherein said server credential and said client credential are used to establish a secure session.

The present disclosure further provides a client network element adapted for secure channel initialization transaction security utilizing a low-entropy shared secret, the client network element being adapted to: choose a random client ephemeral private key; utilize the client ephemeral private key and the shared secret to create a client ephemeral public key at the client network element; forward the client ephemeral public key in a channel initialization request; receive an encrypted payload with a message authentication code 'MAC' and a server ephemeral public key; utilize the server ephemeral public key and the client ephemeral private key to derive the high-entropy shared secret; and decrypt the payload and verify the MAC with the high-entropy shared secret.

The present disclosure further provides a server network element adapted for secure channel initialization transaction security utilizing a low-entropy shared secret, the server network element being adapted to: receive a client ephemeral public key in a channel initialization request; select a random server ephemeral private key; use the server ephemeral private key and the shared secret to create a server ephemeral public key at the server network element; create a high-entropy shared secret based on the client ephemeral public key and the server ephemeral private key; create a message authentication code 'MAC' and encrypt a payload with the high-entropy shared secret; and send the encrypted payload, MAC and the server ephemeral public key to the client network element.

The present disclosure further provides a method to secure channel initialization transaction security utilizing a low-entropy shared secret, the method comprising the steps of: choosing a random client ephemeral private key at a client network element; utilizing the client ephemeral private key and the shared secret to create a client ephemeral public key at the client network element; forwarding the client ephemeral public key in a channel initialization request to a server network element; selecting a random server ephemeral private key at the server network element; using the server ephemeral private key and the shared secret to create a server ephemeral public key at the server network element; creating a high entropy shared secret based on the client ephemeral public key and the server ephemeral private key; creating a message authentication code 'MAC' and encrypting a payload with the high-entropy shared secret; sending the encrypted payload and the server ephemeral public key to the client network element; utilizing the server ephemeral public key and the client ephemeral private key to derive the high-entropy shared secret; and decrypting the payload and verifying the MAC with the high-entropy shared secret.

The present disclosure further provides a system for secure channel initialization transaction security utilizing a low-entropy shared secret, the system having a client network element and server network element and being adapted to: choose a random client ephemeral private key at a client network element; utilize the client ephemeral private key and the shared secret to create a client ephemeral public key at the client network element; forward the client ephemeral public key in a channel initialization request to a server network element; select a random server ephemeral private key at the server network element; use the server ephemeral private key and the shared secret to create a server ephemeral public key at the server network element; create a high entropy shared secret based on the client ephemeral public key and the server ephemeral private key; create a message authentication code 'MAC' and encrypt a payload with the high-entropy shared secret; send the encrypted payload and the server ephemeral public key to the client network element; utilize the server ephemeral public key and the client ephemeral private key to derive the high-entropy shared secret; and decrypt the payload and verify the MAC with the high-entropy shared secret.

Various embodiments of the present disclosure provide an advancement over other solutions. One such solution includes purchasing certificates for each system component from a public certificate authority. Since public certificate authority root certificates are usually included in each system component's trust store out of the box, all system components trust each other's certificates. Hence, system components are able to use SSL/TLS as a secure channel, for example. This solution, however, uses significant overhead for purchasing certificates and involves the cost of purchasing certificates for each system component.

A further solution is to use an internal certificate authority to issue system component certificates. For this solution, the system administrator has to add internal certificate authority root certificates to each system component's trust store. Since each system component certificate will be signed by the trusted internal certificate authority, the system components will be able to use SSL/TLS as a secure channel. While this solution removes the cost of purchasing a set of certificates, this solution requires significant effort to maintain an internal certificate authority. The system administrator is also required to manually add internal system authority root certificates to each system component's trust store.

A further option is to manually add each system component's self-signed certificate to all other system component trust stores, and to use these certificates for SSL/TLS. In this case, each system component may automatically generate a self-signed certificate. Then, a system administrator needs to add each system component self-signed certificate to all of the system component trust stores. Since all self-signed certificates will be trusted by each system component, system components will be able to use SSL/TLS as a secure channel. However, this approach requires a significant effort since it requires manual retrieval of the self-signed certificate from each component and the addition of the certificate to all other component trust stores. The effort has a quadratic dependency on the number of system components. Additionally, a system administrator will be required to repeat the procedure every time a self-signed certificate is regenerated on any system component.

A fourth option would be the use of a low-entropy shared secret with a proprietary secure channel implementation. In this case, each system component may be installed with a password entered by a system administrator during installation. This password will be a low-entropy shared secret known by all system components. This low-entropy shared secret may be used for system component mutual authentication in some non-standard secured channel implementation. However, this approach may not be feasible in certain situations because such non-standard secure channel implementation may not be supported by technology that is used by the system components.

Reference is now made to FIG. 1. The present disclosure relates to the use of a low-entropy shared secret known by all system components. However, in the present method and system, system components are allowed to use any standard secure channel protocol that is supported by the technology used. For example, the present example shows the use of SSL/TLS. As will be appreciated by those skilled in the art, SSL/TLS is merely one example and other examples of secure authentication and authorization should be apparent to those who are skilled in the art. These other examples include, but are not limited to, Wireless Transport Layer Security (WTLS) and Internet Protocol Security (IPSec).

As used herein, "low entropy" describes an entropy that is less than a given particular threshold representing the lowest acceptable entropy for a secret or key. The threshold may vary from country to country, and may also change over time. For example, if the lowest acceptable entropy is currently 80-bit entropy, then low-entropy would refer to less than 80-bit entropy. A key of 40 bits, for example, may be an appropriate low-entropy key in some of the methods and systems of the present disclosure.

The present systems and methods disclosed herein do not require additional manual steps such as: purchasing of certificates, installation and internal certificate authority root certificate or the manual exchange of self-signed certificates by a system administrator.

To communicate over SSL/TLS, each component in the system should trust each other's component certificate. During installation, each component in the system generates a self-signed certificate that will be used as a server certificate.

The present methods and systems disclosed herein use shared low-entropy passwords to achieve the state where each component in the system trusts each other's component certificate.

The shared low-entropy secret may be distributed in various ways and, in one embodiment, it may be entered by the system administrator in the form of a password during each system component installation.

FIG. 1 illustrates a secure channel initialization transaction between a client 110 and a server 112. When a system component needs to connect to another system component, the first system component is designated as client 110 and the system component that needs to be connected to it is designated as server 112. In order to initiate communication, a secure channel initialization transaction takes place. In this regard, client 110 sends a secure channel initialization (SCI) request to server 112 in step 120. This SCI request is received by server 112.

Once server 112 receives the secure channel initialization request 114, the server 112 generates a self-signed client certificate in step 122. Server 112 further makes this client certificate trusted in the step 124. This can be accomplished by adding the client certificate to the trust store of server 112, for example.

Server 112 then sends a SCI response to client 110 in step 130. As will be appreciated, SCI response will generally include client and server certificates. However, in one variation, the SCI response may carry a client user name/password and a server certificate. Other variations will be apparent to those skilled in the art.

Client 110 receives the SCI response and retrieves the certificate or certificates from the response in step 132. In step 134 the client 110 makes the server certificate trusted.

Client 110 then connects to server 112 over SSL using its client certificate in step 140. Server 112 accepts the SSL connection in step 142 using its server certificate.

Consequently, the two components 110 and 112 then can communicate over the established SSL/TLS connection. As discussed above, however, SSL/TLS is described for illustrative purposes, and the systems and methods described herein may be used for other security protocols.

While the SCI request carries no payload, the SCI response carries a sensitive payload wherein confidentiality, integrity and authenticity guarantees are desirable. In the above, with reference to FIG. 1, the SCI response carries client and server certificates or carries client user name/password and server certificates. This, therefore, may have a confidentiality requirement.

The SCI response confidentiality may be protected by a symmetric encryption algorithm such as AES-256. The SCI response integrity and authenticity may be protected with message authentication code (MAC) algorithms such as HMAC-SHA512.

In a further embodiment, SCI response integrity and authenticity may be protected with hash algorithms such as SHA512 if payload hash is concatenated with payload and the product of concatenation is encrypted by the symmetric encryption steps mentioned above.

Both encryption and MAC steps require symmetric keys known by the two system components. Hence, encryption and MAC keys should be negotiated between client and server system components.

It would generally be undesirable to use low-entropy secrets directly for encryption and MAC keys due to offline brute force or dictionary attacks on the keys. The use of low-entropy shared secrets for direct creation of encryption keys would result in keys having low entropy and thus being vulnerable.

Based on this, high-entropy encryption and MAC keys are negotiated on low-entropy based secrets. High-entropy encryption and MAC keys negotiation mechanisms are based on Simple Password Exponentiation Key Exchange (SPEKE) in one embodiment.

Figure 2:
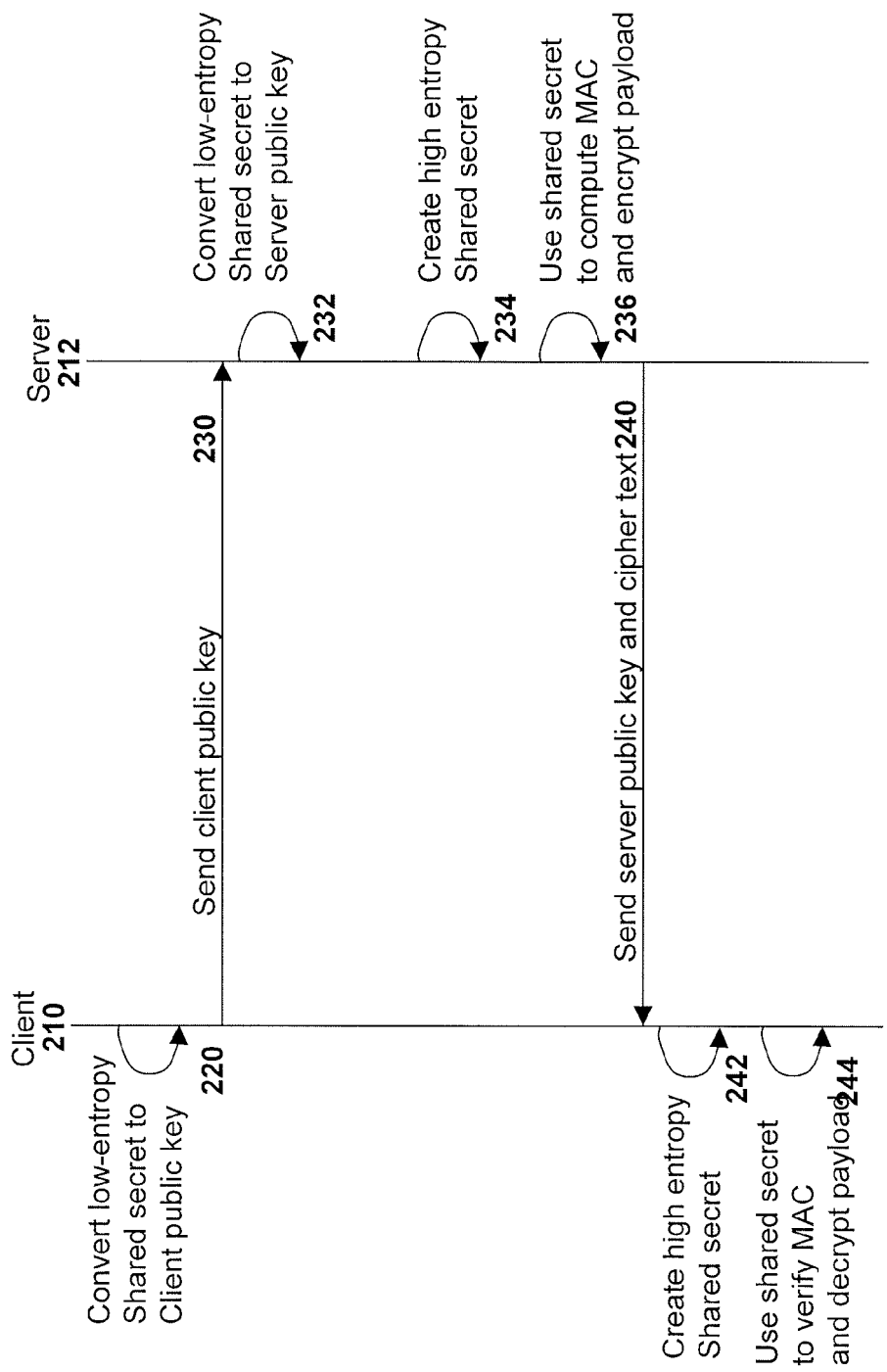
FIG. 2 is a data flow diagram showing a secure channel initialization transaction security method.

Reference is now made to FIG. 2. FIG. 2 illustrates a simplified flow diagram between a client 210 and a server 212 in which a low-entropy shared secret is used to find encryption and MAC keys between a client and server system components.

In the simplified diagram of FIG. 2, client 210 converts a low-entropy shared secret to a client ephemeral public key in step 220 and then sends the client ephemeral public key to server 212 in step 230.

Server 212 receives the client ephemeral public key in from step 230 and converts the known low-entropy shared secret to its own server ephemeral public key in step 232.

The server 212 at step 234 then creates a high-entropy shared secret utilizing the client ephemeral public key and the server ephemeral private key used to create the server ephemeral public key.

In step 236, the shared secret is then used to compute a MAC and to encrypt the payload.

The server then sends its ephemeral public key and cipher text in step 240 to client 210.

Client 210 uses the server ephemeral public key and its ephemeral private key that it used to generate the ephemeral public key in order to create the high-entropy shared secret. The client 210 in step 244 uses the shared secret to verify the MAC and to decrypt the payload.

The above can be implemented, for example, using the generalized SPEKE or Elliptical Curve Simple Password Exponentiation Key Exchange (EC-SPEKE). As will be appreciated, all system components should agree on SCI transaction security domain parameters, and in particular commutative group G parameters. System components may have hard-coded group G parameters. Alternatively, group G parameters can be sent with the SCI request.

As will be appreciated by those skilled in the art, a group G as used herein is a set with a binary operation that satisfies the four axioms: closure, associativity, identity element, and inverse element. This binary operation can be denoted as multiplication "*" or addition "+". In the present disclosure, this binary operation is denoted as addition "+". Thus, if n is a positive integer and S belongs to G, then nS is S added n times to itself.

In a transaction using generalized SPEKE, step 220 of FIG. 2 involves converting a known low-entropy shared secret s to a secret element S in a commutative group G such that S has a large prime order.

The client component 210 then chooses a random positive integer u that is the client ephemeral private key.

The component then computes the client ephemeral public key U=uS.

In step 230 the client 210 sends U to server component 212 in the SCI request.

Similarly, in step 232, the server component 212 uses deterministic rules to convert the low-entropy shared secret s to a secret element S in a commutative group G. In this case, the same S is computed by the client and server components since the deterministic rules are used and the same low-entropy shared secret s is used.

The server 212 chooses a random positive integer v that is the server ephemeral private key.

The server 212 computes a server ephemeral public key V=vS.

The server component 212 can then use, in step 234 the client ephemeral public key U to compute a high-entropy shared secret K. Specifically, K=vU=vuS.

The server 212 can then use the shared secret K to produce an encryption key and a MAC key in step 236. The server component 212 computes the MAC on the payload and encrypts the payload with the MAC to obtain cipher text T.

In step 240 server 212 sends the server ephemeral public key V and the cipher text T in the SCI response.

In step 242, the client 210 uses V to compute the high-entropy shared secret K=uV=uvS. As will be appreciated by those skilled in the art, since vuS=uvS both the client 210 and the server 212 compute the same high-entropy secret.

In step 244 the client component uses K to produce an encryption key and MAC key. The client component 210 decrypts the payload with the MAC and verifies the MAC. The payload can then be used by the client 210.

In an alternative embodiment, elliptical curve SPEKE may be used.

Using elliptical curve SPEKE, field parameters and elliptical curve equation defined over field F, including equation coefficient and field F parameters are public. However, the elliptical curve base point is secret. Hence, a technique to transform a low-entropy secret to a secret base point on the curve is used.

Part of implementing EC-SPEKE is determining deterministic rules to convert a byte array into a point on the curve. One way is to transform a low-entropy secret into a secret positive integer s. Then, a secret base point S will be found by multiplying the same base point B by a secret positive integer S=sB.

Another way is to transform a password into secret coordinates x and y of secret base point of S.

Transforming a password into a positive integer is not difficult. However, to find a secret base point S by multiplying a sample base point B by a secret positive integer utilizes elliptical curve mathematics. This makes the steps more complicated.

To transform a password into secret coordinates, in the case where the field F is all integers with modulo p, transforming the password into secret coordinates of the secret base point can be done in the following way. First, transform the password into a positive integer s. Second, choose the x coordinate to be s modulo p. Third, check if the x coordinate is on the curve, not zero and not a point of infinity and if yes find y such that S=(x, y) is on the curve. If the third step produces a no, the x needs to be modified by increasing x by 1 modulo p and retrying step three.

As will be appreciated, in order to avoid attacks based on password property exploitation (such as English text properties), the principle of substitution and dissemination may be used. The password is hashed with a hash function such as SHA-512. Then, 512-bit output is treated as an unsigned binary integer representation to get a positive integer.

As will be appreciated, the elliptical curve equation is $y^2=x^3+ax+b$ for some a and b from the specified field F. Hence, an arbitrary x coordinate is on the curve if and only if $x^3+ax+b$ is quadratic residue in the field F. To verify if $x^3+ax+b$ is quadratic residue, Legendre symbol is used. If Legendre symbol for $x^3+ax+b$ is 1 in the field F, then the x coordinate is on the curve.

Once it has been verified that the x coordinate is on the curve, the y coordinate is found such that (x, y) is on the curve. In order to find the y coordinate for a given x coordinate, y is found such that $y^2=x^3+ax+b$ in the field F. The Shanks-Tonelli algorithm for solving quadratic congruence may be used to find y.

It is known that the Shanks-Tonelli algorithm terminates. The Legendre symbol calculation takes a single iteration. However, finding an x coordinate on the curve may involve several iterations. Considering that points on the curve are evenly spread along x and y axes and the fact that the number of points on the curve is usually similar to the field size, it should not take many iterations to find an x-coordinate on the curve.

Once a secret point S has been chosen, it is desirable that point S is not a point of infinity and that the order S is large enough to have acceptable negotiated secret entropy. As will be appreciated, any point on the elliptical curve with the cofactor 1 is either a point of infinity or it generates the whole curve. Thus, a randomly chosen secret base point other than a point of infinity will be a good base point.

Referring again to FIG. 2, in step 220 the client component 210 uses deterministic rules to convert a known low-entropy shared secret s to a secret point S on the curve, such that S has a large prime order. As indicated above, if the curve with the cofactor of 1 such as P521 is used, then any point on the curve can be a good secret point S. The client component chooses a random positive integer u that is the client ephemeral private key.

The client component 210 computes a client ephemeral public key U=uS. The client component 210 sends the point U x,y-coordinates to a sever 212 in step 230.

The server component 212 receives point U x,y-coordinates in the SCI request.

In step 232 the server component 212 uses deterministic rules to convert the known low-entropy shared secret s to a secret point S on the curve. This is the same S computed by the client and sever components since the deterministic rules are used and the low-entropy shared secret s is used.

The server component 212 chooses a random positive integer v that is the server ephemeral private key.

The sever component 212 computes the server ephemeral public key V=vS.

In step 234 the server 212 then computes the high-entropy shared secret K=vU=vuS.

The sever component 212, in step 236, uses K to produce an encryption key and a MAC key. The sever component 212 computes the MAC on the payload and encrypts the payload with the MAC in order to obtain the cipher text T.

In step 240 the server component 212 sends the V x,y-coordinates and cipher text T in the SCI response.

The client 210 receives the response from step 240 and computes the high-entropy shared secret K=uV=uvS. Since uvS=uvS both of the client and sever components compute to the same high-entropy secret.

The client component 210 uses K to produce an encryption key and a MAC key in step 244 and then decrypts the payload with the MAC and verifies the MAC. As will be appreciated by those skilled in the art, the above allows system components to use a standard secure channel protocol such as SSL/TLS supported by standard available technologies such J2EE application servers or Microsoft IIS. Only a low-entropy shared secret is utilized and no manual system administrator steps are required except for the entering of this system password for each system component.

In case authentication attributes change, such as the system component server certificate being regenerated, it is enough to merely repeat the secure channel initialization transaction. The secure initialization step requires only a single transaction comprised of a SCI request and a SCI response.

With regard to the security to the above solution, if a AES 256, HMAC-SHA512 and EC-SPEKE with P521 elliptical curve are used, the combination provides 256-bit cryptography strength. Thus, a brute force attack would not succeed because of the 256 bit key strength.

There are no known significant flaws in AES 256. Even considering a birthday attack there are no known significant flaws in SHA512 compression functions, HMAC and the combination of HMAC-SHA512.

SPEKE is not vulnerable to offline brute force or dictionary attacks on low-entropy secrets. Since SPEKE ephemeral keys are the only cryptography tokens an attacker may observe, the attacker will have to guess not only the low-entropy secret, but also the ephemeral private keys to execute brute force attacks. Similarly, pre-calculated dictionaries would have to include ephemeral private keys in case of a dictionary attack.

While the above-described solution may seem vulnerable to online brute force attacks, this is not unexpected since all password-based systems suffer from the same problem. This vulnerability can be easily overcome by limiting the maximum number of attempts. Once the maximum number of attempts has been exceeded, the system may quarantine the alleged attacker by blocking its IP address, for example. Other counter measures may include intentionally slow SCI request processing on a server component.

Figure 3:
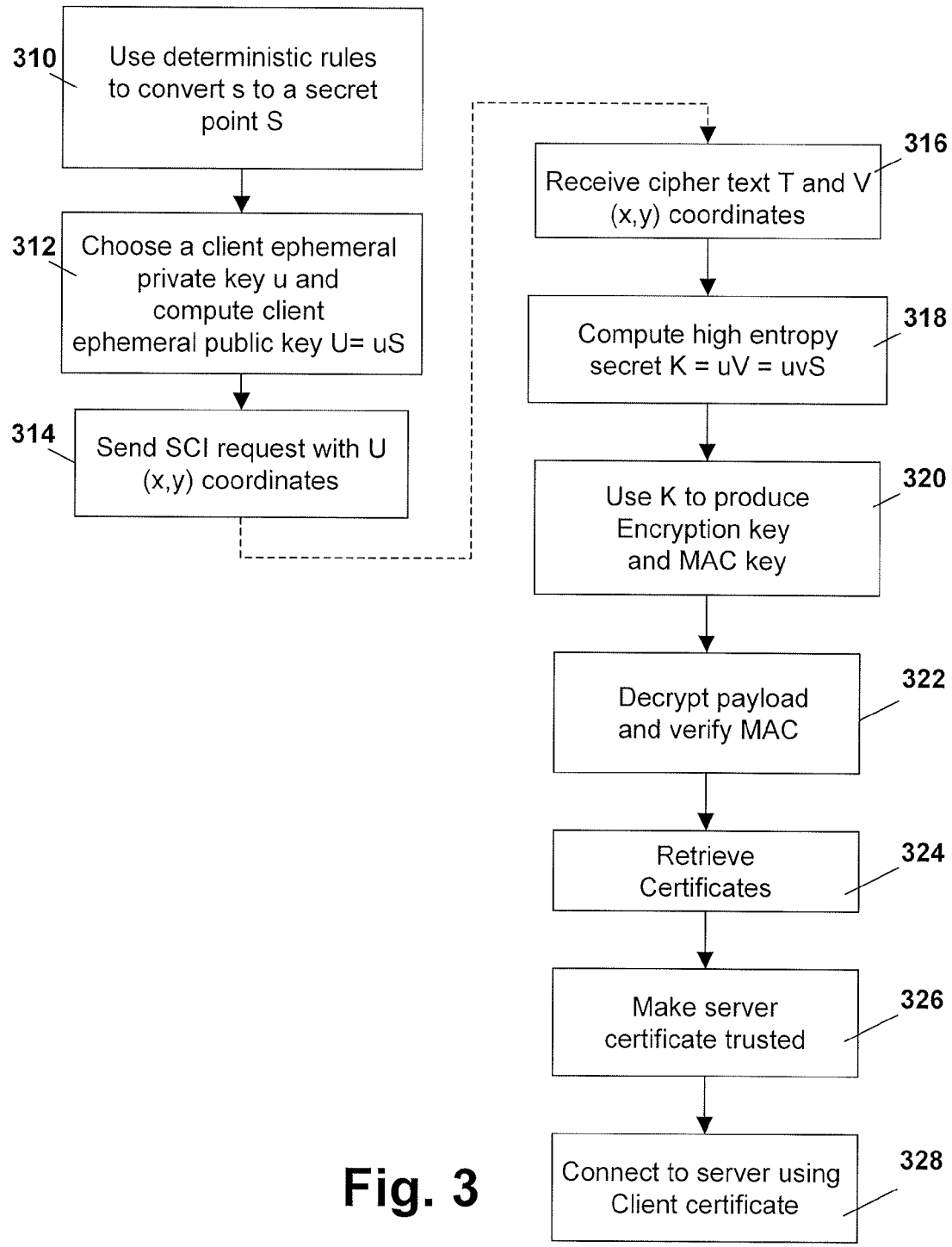
FIG. 3 is a flow chart showing a client side method for secure channel initialization utilizing transaction security with elliptical curve SPEKE.
Figure 4:
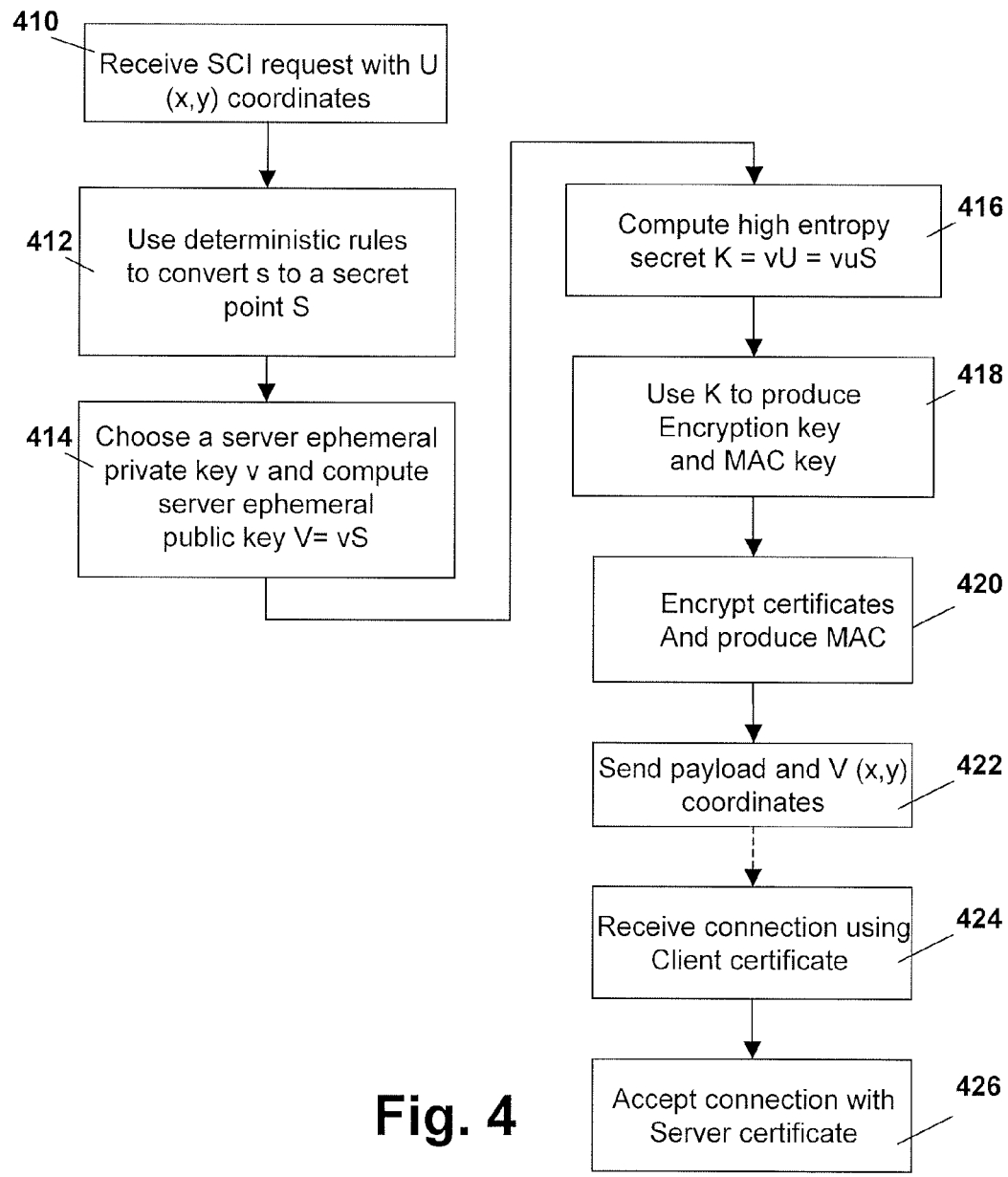
FIG. 4 is a flow chart showing a server side method for secure channel initialization utilizing transaction security with elliptical curve SPEKE.

Based on the above, a combination of FIGS. 1 and 2 for the elliptical curve SPEKE case is illustrated with regard to the client side in FIG. 3 and the server side in FIG. 4.

Reference is now made to FIG. 3. In the example of FIG. 3, the elliptical curve SPEKE method is used.

In step 310, the client side uses deterministic rules to convert a low-entropy secret s to a secret point S. The process then proceeds to step 312.

In step 312, a client ephemeral private key u, which is a random positive integer, is chosen and a client ephemeral public key U=uS is computed.

The process then proceeds to step 314 in which the secure channel initialization request is sent with the x,y-coordinates of U.

The process then proceeds to step 316 in which the client side waits to receive a response from the server. In this case, at step 316 the client side has received cipher text T and the x,y-coordinates of the server ephemeral public key V.

The process then proceeds to step 318 in which a high-entropy secret K is calculated where K is equal to uV, which is equal to uvS.

The process then proceeds to step 320 in which the high-entropy secret is used to produce an encryption key and a MAC key.

The process then proceeds to step 322 in which the payload is decrypted and the MAC is verified.

Once the payload is decrypted and the MAC is verified the process proceeds to step 324 in which the certificates for the server side and the client side are retrieved from the payload. As will be appreciated, instead of a client side certificate a user name and password could instead be provided as described above.

The process then proceeds to step 326 in which the server certificate is made trusted on the client device.

The process then proceeds to step 328 in which the client connects to the server utilizing the client certificate. At this point, communications can proceed between the server and the client on a secure and trusted basis based on SSL/TLS.

Referring to FIG. 4 at step 410 the server side receives a secure channel initialization request with the x,y-coordinates of the ephemeral public key U.

The process then proceeds to step 412 in which deterministic rules are used to convert a shared secret s to a secret point S on a curve.

The process then proceeds to step 414 in which the server ephemeral private key v, which is a random positive integer, is chosen and a server ephemeral public key V=vS is computed.

The process then proceeds to step 416 in which a high-entropy secret K is computed as vU or vuS. As will be appreciated by those skilled in the art, this is the same high-entropy secret that is computed at step 318 in FIG. 3 by the client side.

The process then proceeds to step 418 in which K is used to produce an encryption key and a MAC key.

The process then proceeds to step 420 in which the server and the client certificates are encrypted utilizing the high-entropy secret K and further a MAC is produced. This creates a payload which is encrypted as cipher text.

The payload is sent, along with the x,y-coordinates of the ephemeral public key V in step 422.

The process then proceeds to step 424 in which the server side waits to receive something else from the client and specifically a communication utilizing a SSL/TLS. In step 424, the server side receives a connection utilizing the client's certificate, which can be verified for integrity and authenticity.

At step 426 the process then accepts the connection utilizing a server certificate.

Figure 5:
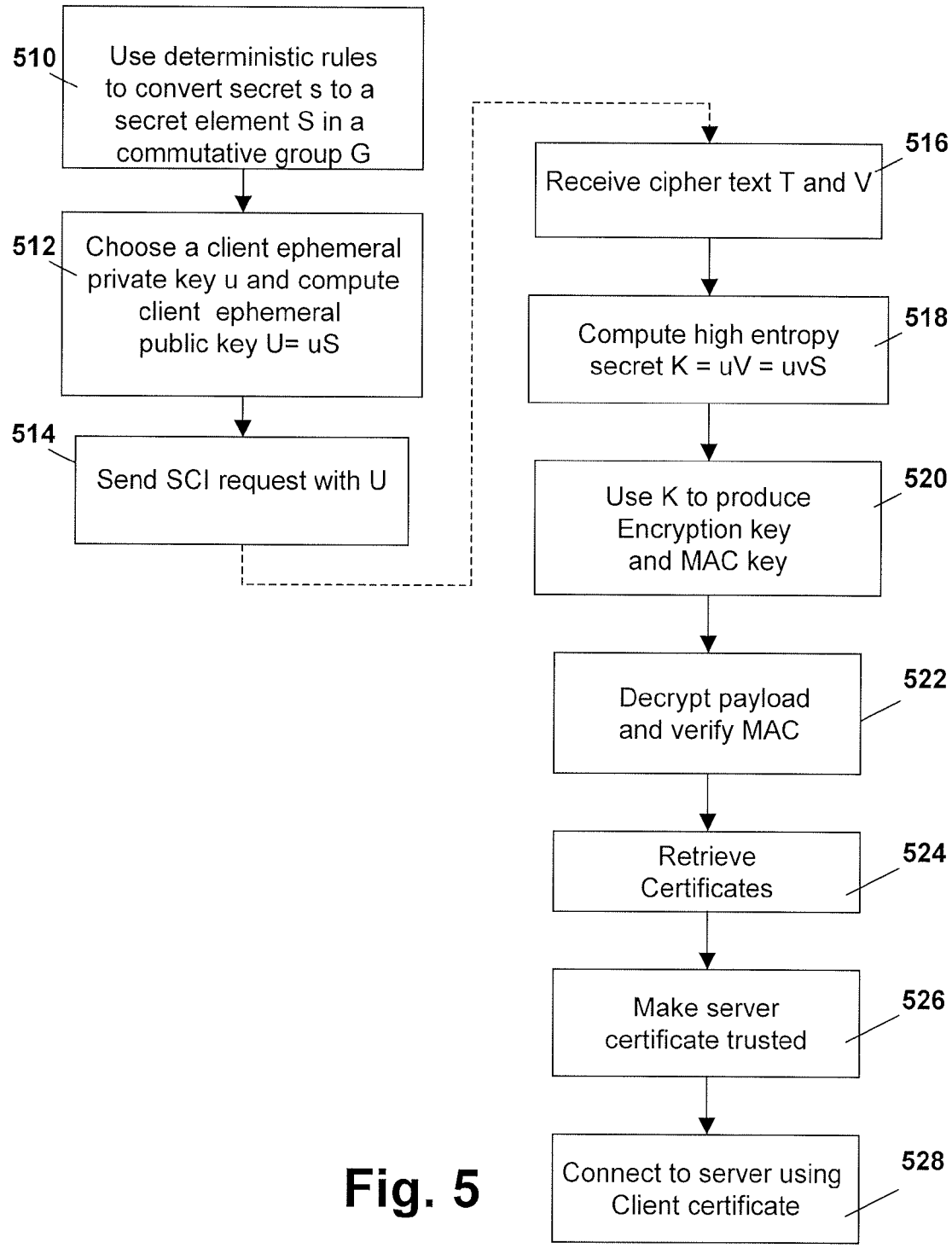
FIG. 5 is a flow chart showing a client side method for secure channel initialization utilizing transaction security with generalized SPEKE.
Figure 6:
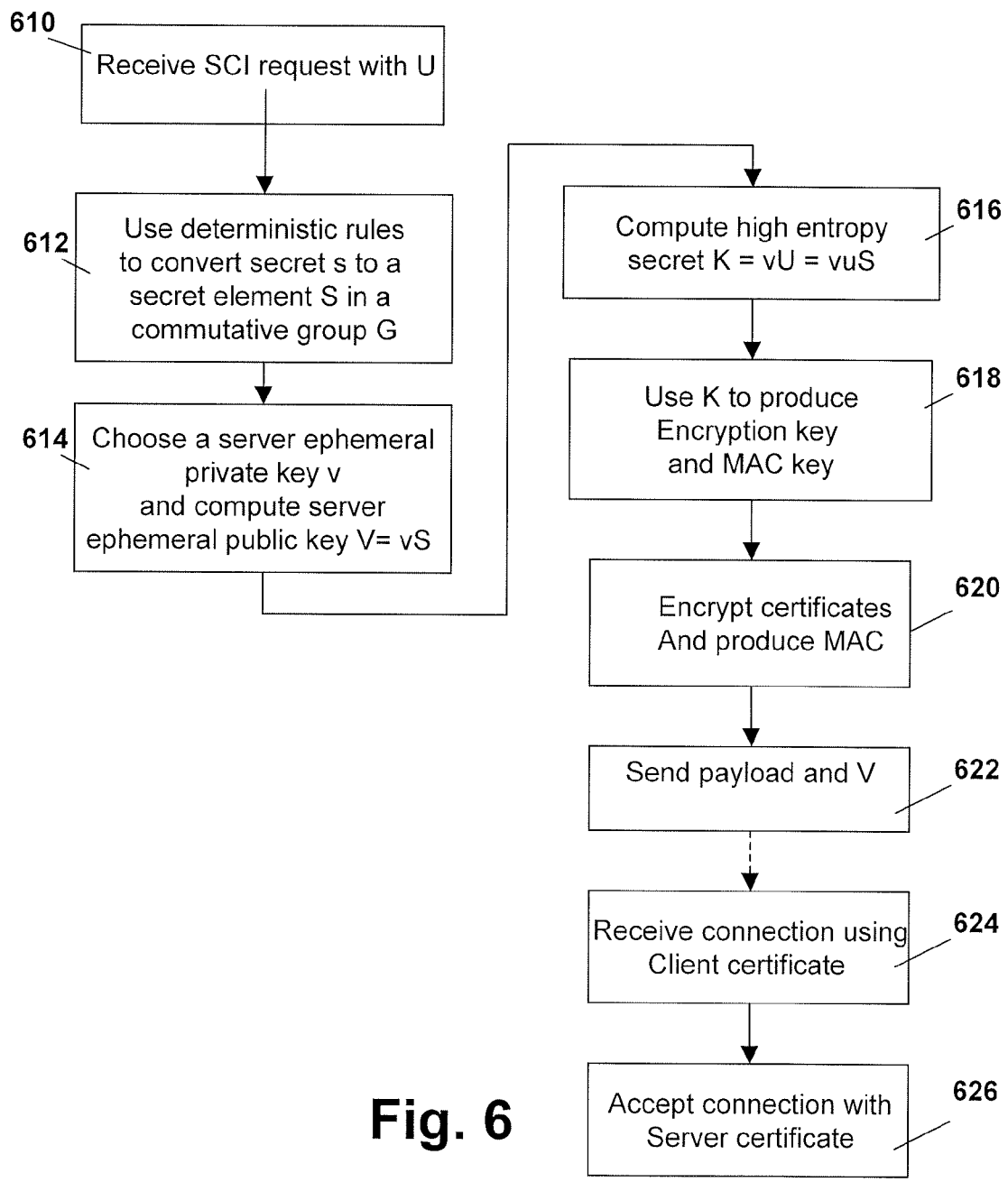
FIG. 6 is a flow chart showing a server side method for secure channel initialization utilizing transaction security with generalized SPEKE.

Based on the above, a combination of FIGS. 1 and 2 for the generalized SPEKE case is illustrated with regard to the client side in FIG. 5 and the server side in FIG. 6.

Reference is now made to FIG. 5. In the example of FIG. 5, generalized SPEKE is used.

In step 510, the client side uses deterministic rules to convert a low-entropy secret s to a secret element S in a commutative group G such that S has a large prime order. The process then proceeds to step 512.

In step 512, a client ephemeral private key u, which is a random positive integer, is chosen and a client ephemeral public key U=uS is computed.

The process then proceeds to step 514 in which the secure channel initialization request is sent with U.

The process then proceeds to step 516 in which the client side waits to receive a response from the server. In this case, at step 516 the client side has received cipher text T and the server ephemeral public key V.

The process then proceeds to step 518 in which a high-entropy secret K is calculated where K is equal to uV, which is equal to uvS.

The process then proceeds to step 520 in which the high-entropy secret is used to produce an encryption key and a MAC key.

The process then proceeds to step 522 in which the payload is decrypted and the MAC is verified.

Once the payload is decrypted and the MAC is verified the process proceeds to step 524 in which the certificates for the server side and the client side are retrieved from the payload. As will be appreciated, instead of a client side certificate a user name and password could instead be provided as described above.

The process then proceeds to step 526 in which the server certificate is made trusted on the client device.

The process then proceeds to step 528 in which the client connects to the server utilizing the client certificate. At this point, communications can proceed between the server and the client on a secure and trusted basis based on SSL/TLS.

Referring to FIG. 6 at step 610 the server side receives a secure channel initialization request with the ephemeral public key U.

The process then proceeds to step 612 in which deterministic rules are used to convert a shared secret s to a secret element S in a commutative group G such that S has a large prime order.

The process then proceeds to step 614 in which a server ephemeral private key v, which is a random positive integer, is chosen and a server ephemeral public key V=vS is computed.

The process then proceeds to step 616 in which a high-entropy secret K is computed as vU or vuS. As will be appreciated by those skilled in the art, this is the same high-entropy secret that is computed at step 518 in FIG. 5 by the client side.

The process then proceeds to step 618 in which K is used to produce an encryption key and a MAC key.

The process then proceeds to step 620 in which the server and the client certificates are encrypted utilizing the high-entropy secret K and further a MAC is produced. This creates a payload which is encrypted as cipher text.

The payload is sent, along with the ephemeral public key V, in step 622.

The process then proceeds to step 624 in which the server side waits to receive something else from the client and specifically a communication utilizing a SSL/TLS. In step 624, the server side receives a connection utilizing the client's certificate, which can be verified for integrity and authenticity.

At step 626 the process then accepts the connection utilizing a server certificate.

As will be appreciated by those skilled in the art, the above can be used in which communication is required by several components of the system. For example, a bank may have a system in which an identity is on a first server, cheques are processed on a second server and loan application are processed on a third server. Each of these servers may need to check with other servers in order to verify that the transaction is valid. The servers therefore need to talk with each other. Other examples include mobile device networks and specifically various network elements within the mobile device network.

The above can be further implemented on any computer readable medium adapted to store program code executable by a processor of a computing system for causing said computing system to perform the methods of FIGS. 1 to 6.

Figure 7:
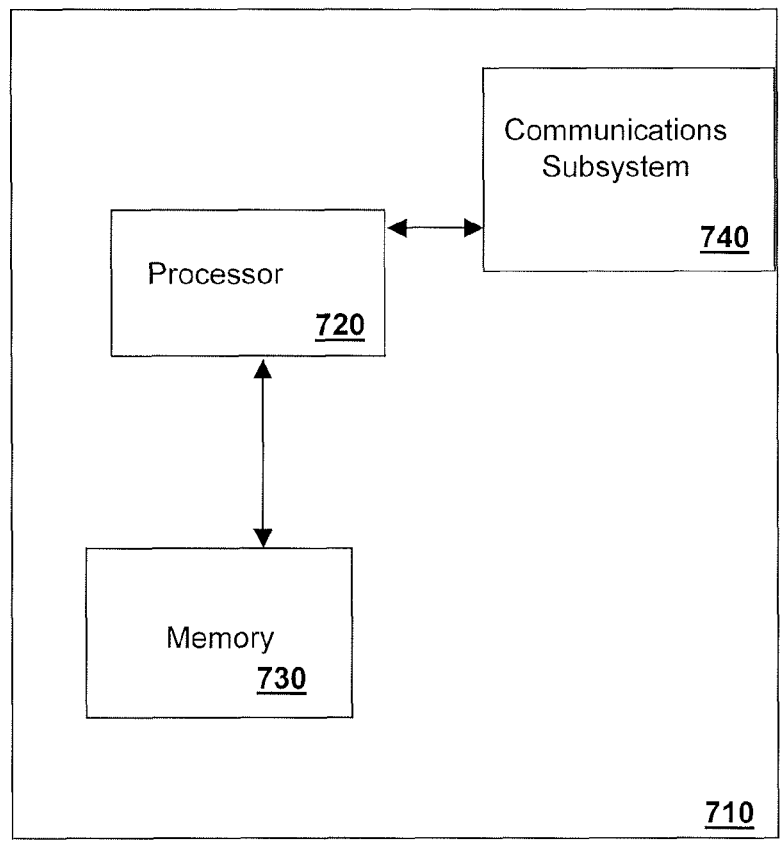
FIG. 7 is a block diagram showing a simplified network element.

Reference is now made to FIG. 7. FIG. 7 shows a simplified diagram of a network element 710. A network element 710 includes a processor 720 adapted to perform one or both the server side or the client side functionality as illustrated by FIGS. 1 to 6 above.

A memory 730 is adapted to store the low-entropy shared secret and to provide this to processor 720 for computing the high-entropy shared secret for communications. Memory 730 is further adapted to include a list of trusted certificates, among other things, as would be appreciated by those skilled in the art.

A communications sub-system 740 is adapted to communicate with other network elements and is utilized to receive communications from a client or server and to provide these communications to processor 720 for processing.

As will be appreciated, the network element of FIG. 7 could be used in conjunction with multiple network elements.

Figure 8:
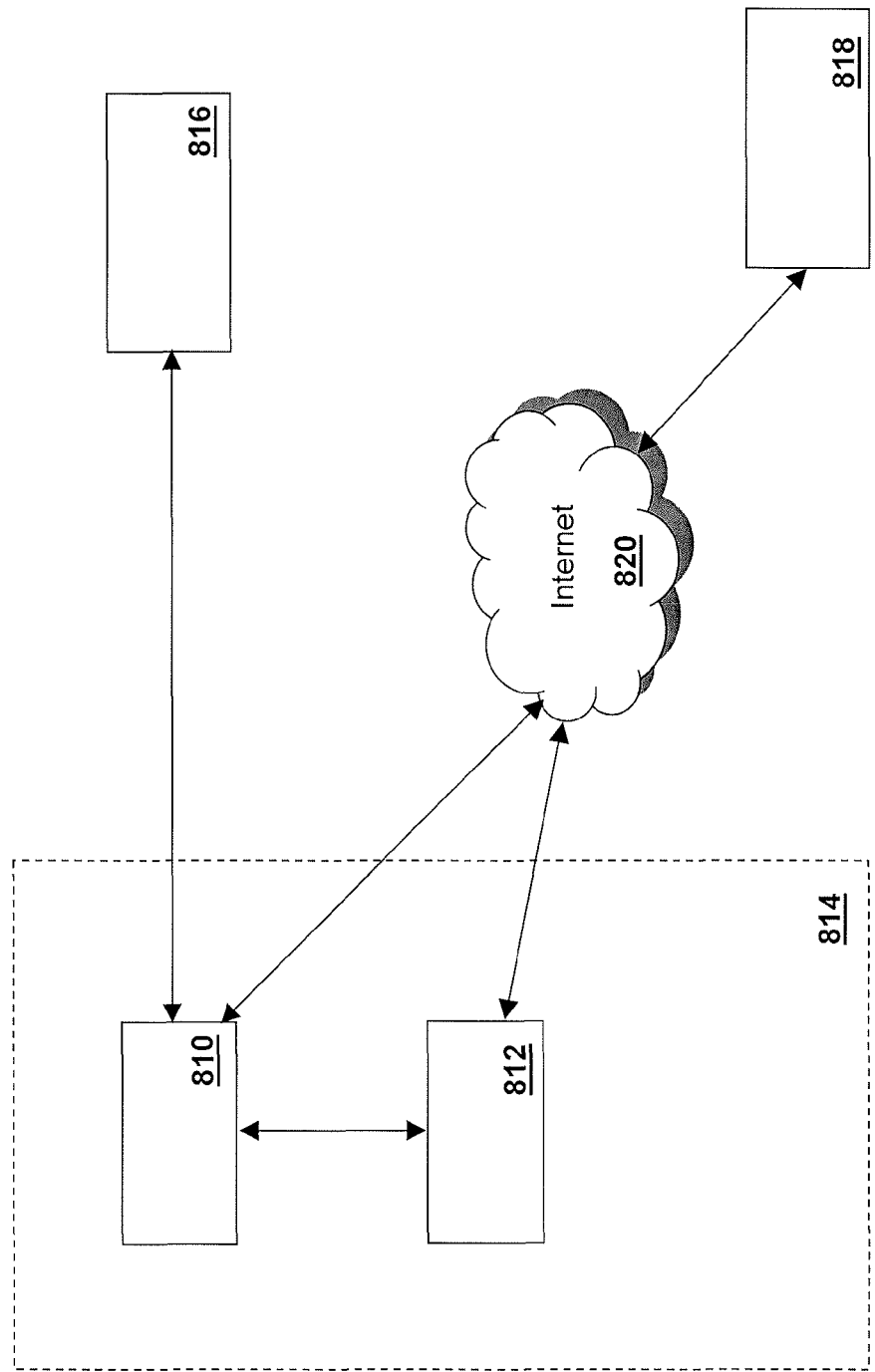
FIG. 8 is a block diagram showing an exemplary network utilizing a variety of communications between or among network elements.

Reference is now made to FIG. 8. FIG. 8 illustrates an exemplary block diagram of a network in which network elements 810, 812, 816 and 818 communicate with each other. FIG. 8 is meant as an example of the way network elements can be connected together.

As seen in FIG. 8, network elements 810 and 812 are co-located at the same location 814 and communicate with each other locally. This can be communication between two servers, a local area network, among others.

Network element 816 is shown located remotely from network element 810 and can communicate with element 810 through various communication means such as a wide area network (WAN) or dedicated communication line.

Network element 818 is also shown as located remotely from network elements 810 and 812 and communicates through the Internet 820 with network elements 810 and 812.

As seen from the example FIG. 8, network element 810 can communicate with multiple network elements.

FIG. 8 is therefore meant to show that various network configurations could exist with various means for communication between the network elements. The present method and system are not meant to be limited by any particular network or communications type between network elements.

Figure 9:
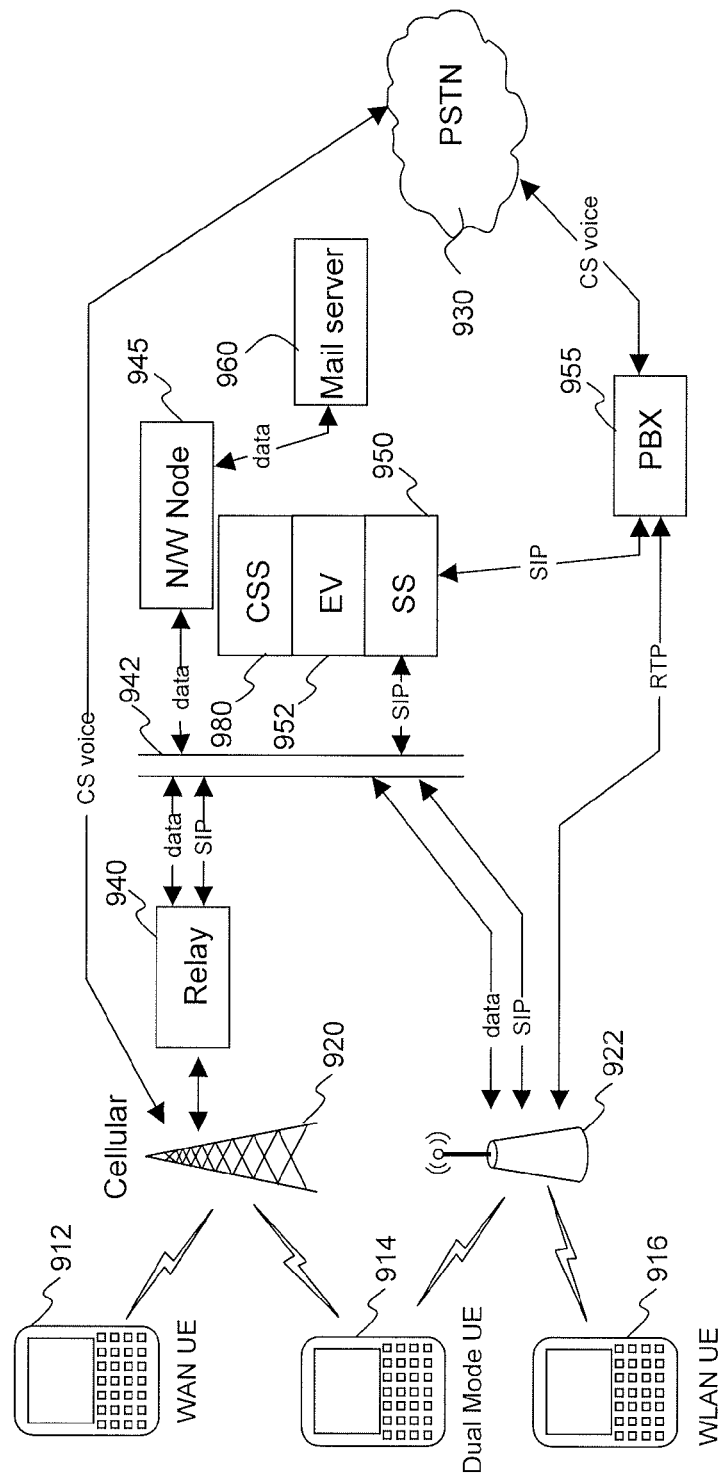
FIG. 9 is a block diagram showing an exemplary mobile network.

One exemplary network that the above system could be used on is illustrated with reference to FIG. 9. FIG. 9 illustrates an architectural overview for a mobile network having voice and data. Three mobile devices, 912, 914 and 916 are illustrated.

Mobile device 912 comprises a single-mode wide area network (WAN) mobile device which communicates with a cellular network 920.

Mobile device 916 comprises a single-mode wireless local area network (WLAN) mobile device which communicates with the data access point 922.

Mobile device 914 comprises a dual-mode mobile device that communicates both with the cellular network 920 and the data access point 922.

Mobile device 914 may connect through cellular network 920 to provide either voice or data services. As will be appreciated, various cellular networks exist including, but not limited to, GSM, General Packet Radio Service (GPRS), CDMA, Universal Mobile Telecommunications System (UMTS), Wideband Code Division Multiple Access (WCDMA), among others. These technologies allow the use of voice, data or both at one time.

A circuit switched call, as seen from FIG. 9, will proceed through a circuit switched voice channel to Public Switched Telephone Network (PSTN) 930.

Data proceeds through a relay 940, and may proceed through a firewall 942 to one of several servers servicing the data call.

As seen in FIG. 9, data proceeds through the firewall 942 to a network node 945 and potentially out to a Mail Server 960, depending on the nature of the data.

If the call is a transmission of voice over a data connection using VoIP, the data proceeds over session initiation protocol (SIP) to a SIP server 950.

From SIP server 950, the VoIP call proceeds over a private branch exchange (PBX) 955 and then becomes a circuit-switched voice call over PSTN 930.

Mobile device 914 can further communicate over a data access point for a wireless local area network (WLAN). Examples of WLAN technologies include Wireless Fidelity (WiFi) or Worldwide Interoperability for Microwave Access (WiMax) as underlying technologies of wireless local area networks.

As with the cellular connection, data and VoIP calls can be routed through firewall 942 to either the network node 945 or to SIP server 950. The VoIP call then proceeds again through PBX 955 to PSTN 930.

Alternatively, the VoIP call can be routed through a real time transport protocol (RTP) directly to the private branch exchange 955, at which point it is converted to a circuit switched call and routed through the PSTN 930.

An Enterprise Voice Server 952 may be included for various functionality, including monitoring voice calls, providing call statistics, call costs, policy usage, among others.

A call statistics server 980 may be located within an enterprise. As will be appreciated by those skilled in the art, call statistics server 980 may be part of a network node 945 or can be a separate server communicating with the network node 945.

Call statistics server 980 can receive call statistic information from handheld mobile devices or gather these statistics directly through the monitoring of voice call set-up, throughput and disconnection traffic, and hold this information for use by corporate IT and handheld users.

The systems and methods of the present application provide for secure and authenticated communications between network elements. For example, the methods can be used between call statistics server 980 and network node 945 in some embodiments. Enterprise Voice Server 952 might, in some embodiments, also require secure communications with call statistics server 980 and/or network node 945. In one embodiment the methods described herein may also be used to secure communications with any mobile device such as devices 912, 914 and 916, or any other wireless device, cellular phone, smart phone, personal digital assistant, laptop, personal computer, or the like. Other network elements may also be involved.

A system administrator could, in one embodiment, create a shared low entropy secret and input this onto each network element. The network elements could then utilize the shared secret as indicated above with reference to FIGS. 1 to 6.

If the methods of the present disclosure are used in association with a mobile device, an exemplary mobile device is illustrated with reference to FIG. 10. This is not meant to be limiting, but is provided for illustrative purposes.

Figure 10:
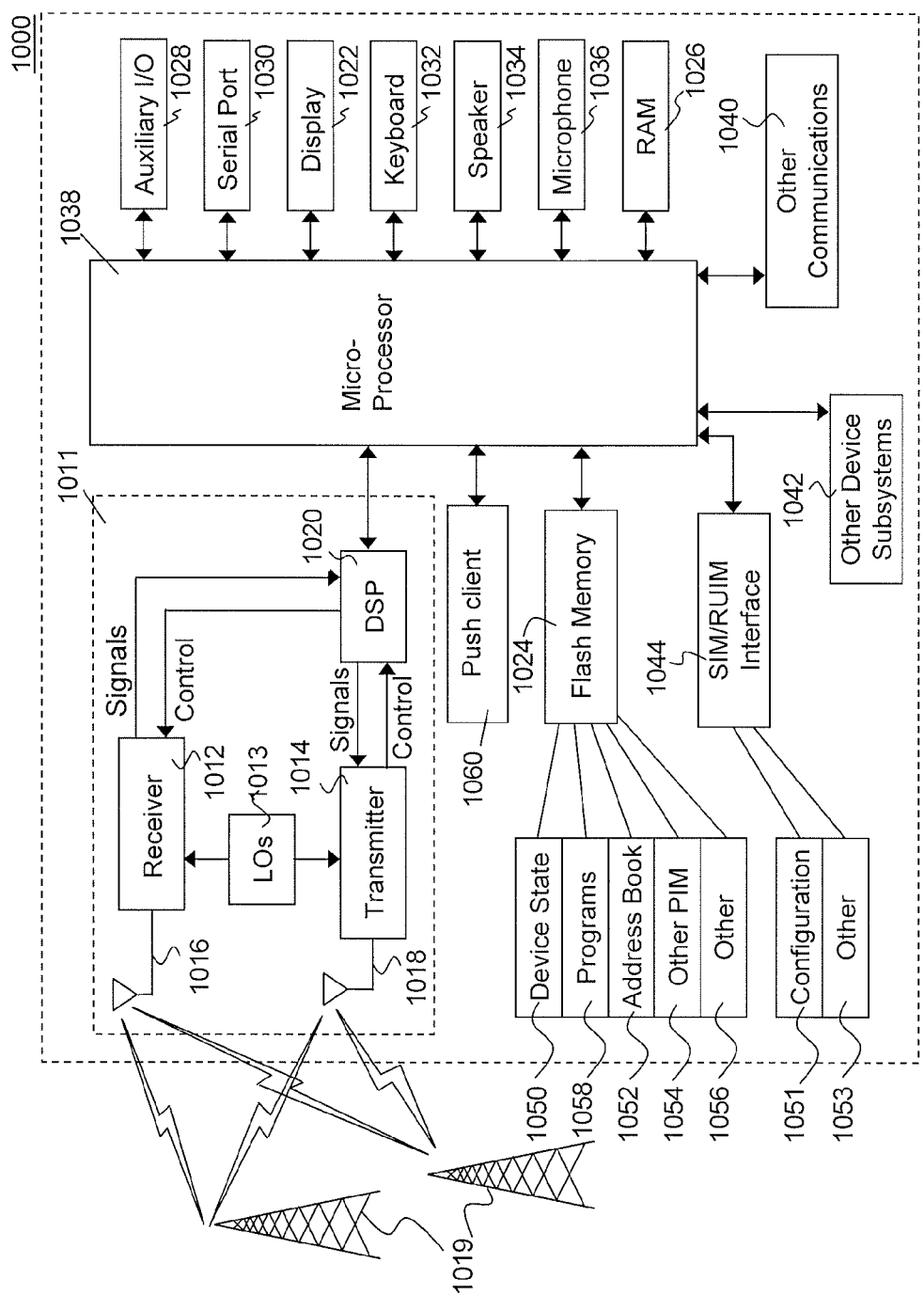
FIG. 10 is a block diagram showing an exemplary mobile device.

FIG. 10 is a block diagram illustrating a mobile device apt to be used with various embodiments of the apparatus and method of the present application. Mobile device 1000 may comprise a two-way wireless communication device having at least voice and data communication capabilities. Mobile device 1000 may have the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1000 is enabled for two-way communication, it will incorporate a communication subsystem 1011, including both a receiver 1012 and a transmitter 1014, as well as associated components such as one or more, embedded or internal, antenna elements 1016 and 1018, local oscillators (LOs) 1013, and a processing module such as a digital signal processor (DSP) 1020. As will be apparent to those skilled in the field of communications, the particular design of the communication subsystem 1011 may be dependent upon the communication network in which the device is intended to operate.

Network access requirements may also vary depending upon the type of network 1019. In some CDMA networks network access is associated with a subscriber or user of mobile device 1000. A CDMA mobile device may require a removable user identity module (RUIM) or a subscriber identity module (SIM) card in order to operate on a CDMA network. The SIM/RUIM interface 1044 is normally similar to a card-slot into which a SIM/RUIM card can be inserted and ejected like a diskette or PCMCIA card. The SIM/RUIM card can have approximately 64K of memory and hold many key configuration 1051, and other information 1053 such as identification, and subscriber related information.

When required network registration or activation procedures have been completed, mobile device 1000 may send and receive communication signals over the network 1019. As illustrated in FIG. 10, network 1019 can consist of multiple base stations communicating with the mobile device. For example, in a hybrid CDMA 1×EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 1016 through communication network 1019 are input to receiver 1012, which may perform such common receiver functions as signal amplification, frequency down conversion, filtering, channel selection and the like, and in the example system shown in FIG. 10, analog to digital (A/D) conversion. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 may include a microprocessor 1038 which controls the overall operation of the device. Communication functions, including at least data and voice communications, are performed through communication subsystem 1011. Microprocessor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 may include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the microprocessor 1038 is stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Microprocessor 1038, in addition to its operating system functions, enables execution of software applications on the mobile device. A predetermined set of applications that control basic operations, including at least data and voice communication applications for example, will normally be installed on mobile device 1000 during manufacturing. Other applications may be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores may be available on the mobile device to facilitate storage of PIM data items. Such PIM application may have the ability to send and receive data items, via the wireless network 1019. In one embodiment, the PIM data items are seamlessly integrated, synchronized and updated, via the wireless network 1019, with the mobile device user's corresponding data items stored or associated with a host computer system. Further applications may also be loaded onto the mobile device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the microprocessor 1038. Such flexibility in application installation increases the functionality of the device and may provide enhanced on-device functions, communication-related functions, or both. For example, secure communication applications may enable electronic commerce functions and other such financial transactions to be performed using the mobile device 1000.

In a data communication mode, a received signal such as a text message or web page download will be processed by the communication subsystem 1011 and input to the microprocessor 1038, which may further processes the received signal for element attributes for output to the display 1022, or alternatively to an auxiliary I/O device 1028. A push client 1060 could also process the input.

A user of mobile device 1000 may also compose data items such as email messages for example, using the keyboard 1032, which may comprise a complete alphanumeric keyboard or telephone-type keypad, in conjunction with the display 1022 and possibly an auxiliary I/O device 1028. In some embodiments display 1022 may comprise a touchscreen display, and the keyboard 1032 may comprise a virtual keyboard. The composed items may then be transmitted over a communication network through the communication subsystem 1011. Security for such communications is enabled through the use of a low entropy shared secret as outlined above with regards to FIGS. 1 to 6.

For voice communications, overall operation of mobile device 1000 is similar, except that received signals maybe output to a speaker 1034 and signals for transmission may be generated by a microphone 1036. Alternative voice or audio I/O subsystems, such as a voice message recording subsystem, may also be implemented on mobile device 1000. Although voice or audio signal output may beaccomplished primarily through the speaker 1034, display 1022 may also be used to provide an indication of the identity of a calling party, the duration of a voice call, or other voice call related information for example.

Serial port 1030 in FIG. 10 may normally be implemented in a personal digital assistant (PDA)-type mobile device for which synchronization with a user's desktop computer (not shown) may be desirable, but is an optional device component. Such a port 1030 may enable a user to set preferences through an external device or software application and may extend the capabilities of mobile device 1000 by providing for information or software downloads to mobile device 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the mobile device to a computer to act as a modem.

Other communications subsystems 1040, such as a short-range communications subsystem, is a further optional component which may provide for communication between mobile device 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may also be used for WiFi communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for secure channel initialization transaction security utilizing a low-entropy shared secret at a client network device, the method comprising:

choosing a random client ephemeral private key at a client network device;

utilizing the client ephemeral private key and the shared secret to create a client ephemeral public key at the client network device;

forwarding the client ephemeral public key, from the client network device to a server network device, in a channel initialization request;

receiving, at the client network device, a payload encrypted with a high entropy shared secret, a message authentication code 'MAC' based on the payload and the high entropy shared secret, and a server ephemeral public key, the encrypted payload including a client credential and a server credential, the client credential having been generated by the server network device;

utilizing the server ephemeral public key and the client ephemeral private key to derive the high-entropy shared secret at the client network device;

decrypting the payload and verifying the MAC with the high-entropy shared secret at the client network device; and using the client credential and the server credential to establish a secure session.

2. The method of claim 1 wherein the creating of a client public key utilizes Elliptical Curve Simple Password Exponentiation Key Exchange.

3. The method of claim 2 wherein the act of forwarding forwards x,y-coordinates for the client ephemeral public key.

4. The method of claim 2 wherein the act of receiving comprises receiving x,y-coordinates for the server ephemeral public key.

5. A non-transitory computer readable medium storing program code executable by a processor of a computing system for causing said computing system to perform the method of claim 1.

6. A method for secure channel initialization transaction security utilizing a low-entropy shared secret at a server network device, the method comprising:

receiving, at the server network device, a client ephemeral public key in a channel initialization request from a client network device;

selecting a random server ephemeral private key at the server network device;

using the server ephemeral private key and the shared secret to create a server ephemeral public key at the server network device;

creating a high-entropy shared secret based on the client ephemeral public key and the server ephemeral private key at the server network device;

encrypting, at the server network device, a payload with the high-entropy shared secret, the payload including a client credential and a server credential, the client credential having been generated by the server network device;

generating a message authentication code 'MAC' based on the payload and the high-entropy shared secret:

sending the encrypted payload, the MAC and the server ephemeral public key from the server network device to the client network device; and using the client credential and the server credential to establish a secure session.

7. The method of claim 6 wherein the creating of a server public key utilizes Elliptical Curve Simple Password Exponentiation Key Exchange.

8. The method of claim 7 wherein the receiving of the client ephemeral public key receives x,y-coordinates for the client ephemeral public key.

9. The method of claim 7 wherein the act of sending sends x,y-coordinates for the server ephemeral public key.

10. A client network device configured for secure channel initialization transaction security utilizing a low-entropy shared secret, the client network device being configured to:

choose a random client ephemeral private key;

utilize the client ephemeral private key and the shared secret to create a client ephemeral public key at the client network element;

forward the client ephemeral public key in a channel initialization request;

receive a payload encrypted with a high entropy shared secret, a message authentication code 'MAC' based on the payload and the high entropy shared secret, and a server ephemeral public key, the payload including a client credential and a server credential, the client credential having been generated by the server network device;

utilize the server ephemeral public key and the client ephemeral private key to derive the high-entropy shared secret;

decrypt the payload and verify the MAC with the high-entropy shared secret; and use the client credential and server credential to establish a secure session.

11. The client network device of claim 10 wherein the creation of the client public key utilizes Elliptical Curve Simple Password Exponentiation Key Exchange.

12. A server network device configured for secure channel initialization transaction security utilizing a low-entropy shared secret, the server network device being configured to:

receive a client ephemeral public key in a channel initialization request;

select a random server ephemeral private key;

use the server ephemeral private key and the shared secret to create a server ephemeral public key at the server network element;

create a high-entropy shared secret based on the client ephemeral public key and the server ephemeral private key;

encrypt a payload with the highentropy shared secret, the payload including a client credential and a server credential, the client credential having been generated by the server network device;

generate a message authentication code 'MAC' based on the payload and the high-entropy shared secret;

send the encrypted payload, the MAC and the server ephemeral public key to the client network element; and use the client credential and the server credential to establish a secure session.

13. The server network device of claim 12 wherein the creation of a server public key utilizes Elliptical Curve Simple Password Exponentiation Key Exchange.

14. A method to secure channel initialization transaction security utilizing a low-entropy shared secret, the method comprising the steps of:

choosing a random client ephemeral private key at a client network element;

utilizing the client ephemeral private key and the shared secret to create a client ephemeral public key at the client network element;

forwarding the client ephemeral public key in a channel initialization request to a server network element;

selecting a random server ephemeral private key at the server network element;

using the server ephemeral private key and the shared secret to create a server ephemeral public key at the server network element;

creating a high entropy shared secret based on the client ephemeral public key and the server ephemeral private key at the server network element;

encrypting a payload at the server network element, with the high-entropy shared secret, the payload including a client credential and a server credential, the client credential having been generated by the server network element;

generating a message authentication code 'MAC' based on the payload and the high-entropy shared secret at the server network element;

sending the encrypted payload, the MAC and the server ephemeral public key to the client network element;

utilizing the server ephemeral public key and the client ephemeral private key to derive the high-entropy shared secret at the client network element:

decrypting the payload and verifying the MAC with the high-entropy shared secret at the client network element: and using the client credential and server credential to establish a secure session between the client network element and the server network element.

15. The method of claim 14 wherein the creating of a client public key utilizes elliptical curve Simple Password Exponentiation Key Exchange.

16. The method of claim 15 wherein the forwarding step forwards x,ycoordinates for the client ephemeral public key.

17. The method of claim 15 wherein the sending step sends the x,y-coordinates for the server ephemeral public key.

18. A system for secure channel initialization transaction security utilizing a low-entropy shared secret, the system having a client network element and server network element and being adapted to:

choose a random client ephemeral private key at the client network element;

utilize the client ephemeral private key and the shared secret to create a client ephemeral public key at the client network element;

forward the client ephemeral public key in a channel initialization request to a server network element;

select a random server ephemeral private key at the server network element;

use the server ephemeral private key and the shared secret to create a server ephemeral public key at the server network element;

create a high entropy shared secret based on the client ephemeral public key and the server ephemeral private key at the server network element;

encrypt a payload, at the server network element, with the high-entropy shared secret, the payload including a client credential and a server credential, the client credential having been generated by the server network element:

generate a message authentication code 'MAC' based on the payload and the high-entropy shared secret, at the server network element, send the encrypted payload and the server ephemeral public key to the client network element;

utilize the server ephemeral public key and the client ephemeral private key to derive the high-entropy shared secret at the client network element;

decrypt the payload and verify the MAC with the high-entropy shared secret at the client network element; and use the client credential and the server credential to establish a secure session between the client network element and the server network element.

19. The system of claim 18 wherein the creating of a client public key utilizes elliptical curve Simple Password Exponentiation Key Exchange.

* * * * *